United States Patent [19]

Collette et al.

[11] Patent Number: 5,520,877
[45] Date of Patent: *May 28, 1996

[54] METHOD OF FORMING CONTAINER WITH HIGH-CRYSTALLINITY SIDEWALL AND LOW-CRYSTALLINITY BASE

[75] Inventors: Wayne N. Collette, Merrimack; Suppayan M. Krishnakumar, Nashua, both of N.H.; Chi C. Lin, Hsien, Taiwan

[73] Assignee: Continental PET Technologies, Inc., Del.

[*] Notice: The term of this patent shall not extend beyond the expiration date of Pat. No. 5,281,387.

[21] Appl. No.: 82,029

[22] Filed: Jun. 30, 1993

Related U.S. Application Data

[63] Continuation-in-part of Ser. No. 909,988, Jul. 7, 1992, Pat. No. 5,281,387.

[51] Int. Cl.⁶ .............. B29C 49/18; B29C 49/64
[52] U.S. Cl. .............. 264/521; 264/530; 264/906; 425/526
[58] Field of Search ................ 264/520, 521, 264/529, 530, 534, 230, 342 R, 906; 425/526

[56] References Cited

U.S. PATENT DOCUMENTS

| | | | |
|---|---|---|---|
| 4,233,022 | 11/1980 | Brady et al. | 264/521 |
| 4,334,627 | 6/1982 | Krishnakumar et al. | |
| 4,385,089 | 5/1983 | Bonnebat et al. | 264/529 |
| 4,550,007 | 10/1985 | Ohtsi et al. | 264/530 |
| 4,584,158 | 4/1986 | Nilsson et al. | 264/534 |
| 4,704,243 | 11/1987 | Nilsson et al. | 264/532 |
| 4,710,118 | 12/1987 | Krishnakumar et al. | |
| 4,725,464 | 2/1988 | Collette et al. | |
| 4,755,404 | 7/1988 | Collette. | |
| 4,836,971 | 6/1989 | Denis et al. | 264/530 |
| 4,853,171 | 8/1989 | Ajmera. | |
| 4,863,046 | 9/1989 | Collette et al. | |
| 4,871,507 | 10/1989 | Ajmera. | |
| 4,927,679 | 5/1990 | Beck | 264/532 |
| 5,066,528 | 11/1991 | Krishnakumar et al. | |
| 5,178,816 | 1/1993 | Suzuki et al. | 264/521 |

FOREIGN PATENT DOCUMENTS

| | | | |
|---|---|---|---|
| 9064862 | of 0000 | Australia. | |
| 0155763 | 9/1985 | European Pat. Off.. | |
| 0197780A3 | 10/1986 | European Pat. Off.. | |
| 0237459A1 | 9/1987 | European Pat. Off.. | |
| 442836 | 8/1991 | European Pat. Off. | 264/521 |
| 3221273A1 | 12/1983 | Germany. | |
| 56-105935 | 8/1981 | Japan. | |
| 57-053326 | 3/1982 | Japan | 264/529 |
| 57-77536 | 5/1982 | Japan. | |
| 58-56828 | 4/1983 | Japan | 264/529 |
| 60-268426 | 11/1986 | Japan. | |
| 62-030018 | 2/1987 | Japan | 264/530 |
| 62-238730 | 10/1987 | Japan | 264/535 |
| 63-122516 | 5/1988 | Japan. | |
| 1-157828 | 6/1989 | Japan. | |
| 1-310933 | 12/1989 | Japan. | |
| 2-209219 | 8/1990 | Japan. | |
| 4144731 | 5/1992 | Japan. | |
| 1341845 | 12/1973 | United Kingdom. | |
| 1481637 | 8/1977 | United Kingdom. | |
| 2050919 | 1/1981 | United Kingdom. | |
| 2108899 | 5/1983 | United Kingdom. | |
| 2150488 | 7/1985 | United Kingdom. | |
| WO86/03713 | 7/1986 | WIPO. | |

*Primary Examiner*—Catherine Timm
*Attorney, Agent, or Firm*—Wolf, Greenfield & Sacks

[57] ABSTRACT

A method of making a polyester container having an enhanced level of crystallinity in the sidewall while maintaining a low level of crystallinity in a thickened base portion. The container is particularly useful as a refillable container which can withstand higher caustic wash temperatures and exhibits reduced flavor carryover, or as a hot-fill container. According to the method, a sidewall-forming section of a preform is initially expanded, heated to contract and crystallize the same, and than reexpanded; a base-forming portion of the preform is shielded from the heat treatment and is expanded either before or after the heat treatment step.

45 Claims, 10 Drawing Sheets

5,520,877

METHOD OF FORMING CONTAINER WITH HIGH-CRYSTALLINITY SIDEWALL AND LOW-CRYSTALLINITY BASE

RELATED APPLICATIONS

This is a continuation-in-part of commonly owned U.S. Ser. No. 07/909,988 entitled REFILLABLE HIGH-PERFORMANCE PRESSURE CONTAINER AND METHOD OF FORMING SAME filed Jul. 7, 1992 by W. Collette, S. Krishnakumar and C. Lin now U.S. Pat. No. 5,281,387.

FIELD OF THE INVENTION

This invention relates to new and useful improvements in containers, and more particularly to a method of forming a container having enhanced sidewall crystallinity and low base crystallinity. The container is particularly adapted for use as a refillable carbonated beverage container able to withstand higher caustic wash temperatures and exhibit reduced product flavor carryover, or as a hot fill container.

BACKGROUND OF THE INVENTION

The market for PET refillable carbonated soft drink (CSD) bottles has enjoyed significant growth worldwide since its introduction in 1987 by Continental PET Technologies. These bottles have been commercialized throughout much of Europe, Central and South America, and are now moving into the Far East market.

Refillable bottles reduce the existing landfill and recycle problems associated with disposable plastic beverage bottles. In addition, a refillable bottle provides a safer, lighter-weight plastic container in those markets, currently dominated by glass, where legislation prohibits use of non-returnable packages. The goal is to produce a refillable bottle having the necessary physical characteristics to withstand numerous refill cycles, and which is still economical to produce.

Generally, a refillable plastic bottle must maintain its functional and aesthetic features over a minimum of 10 and preferably over 20 cycles or loops to be considered economically feasible. A loop is comprised of (1) an empty hot caustic wash followed by (2) contaminant inspection and product filling/capping, (3) warehouse storage, (4) distribution to wholesale and retail locations and (5) purchase, use and empty storage by the consumer followed by eventual return to the bottler. This cycle is illustrated in FIG. 1. In an alternative cycle, the contaminant inspection occurs prior to the caustic wash.

Refillable containers must meet several key performance criteria to achieve commercial viability, including:

1. high clarity (transparency) to permit on-line visual inspection;
2. dimensional stability over the life of the container; and
3. resistance to caustic wash induced stress cracking and leakage.

A commercially successful PET refillable CSD container is presently being distributed by The Coca-Cola Company in Europe (hereinafter "the prior art container"). This container is formed of a single layer of a polyethylene terephthalate (PET) copolymer having 3–5% comonomer, such as 1,4-cyclohexanedimethanol (CHDM) or isophthalic acid (IPA). The preform, from which this bottle is stretch blow molded, has a sidewall thickness on the order of 5–7 mm, or about 2–2.5 times that of a preform for a disposable one-way bottle. This provides a greater average bottle sidewall thickness (i.e., 0.5–0.7 mm) required for abuse resistance and dimensional stability, based on a planar stretch ratio of about 10:1. The average crystallinity in the panel (cylindrical sidewall section beneath the label) is about 15–20%. The high copolymer content prevents visual crystallization, i.e., haze, from forming in the preform during injection molding. Preform haze is undesirable because it produces bottle haze which hinders the visual on-line inspection required of commercial refill containers. Various aspects of this prior art container are described in Continental PET Technology's U.S. Pat. Nos. 4,725,464, 4,755,404, 5,066,528 and 5,198,248.

The prior art container has a demonstrated field viability in excess of 20 refill trips at caustic wash temperatures of up to 60° C. Although successful, there exists a commercial need for an improved container that permits an increase in wash temperature of greater than 60° C., along with a reduction in product flavor carryover. The latter occurs when flavor ingredients from a first product (e.g., root beer) migrate into the bottle sidewall and subsequently permeate into a second product (e.g., club soda) on a later fill cycle, thus influencing the taste of the second product. An increase in wash temperature may also be desirable in order to increase the effectiveness and/or reduce the time of the caustic wash, and may be required with certain food products such as juice or milk.

Thus, it would be desirable to increase the caustic wash temperature above 60° C. for a returnable bottle having a lifetime of at least 10 refill trips, and preferably 20 refill trips, and to reduce the product flavor carryover. These and other objects are achieved by the present invention as set forth below.

SUMMARY OF THE INVENTION

In accordance with this invention, a method of forming a container is provided having an enhanced level of sidewall crystallinity and a low level of base crystallinity. The container has improved resistance to caustic stress cracking, while maintaining a high level of transparency (clarity) and dimensional stability, and thus is particularly suitable for refillable beverage bottles. The container has a lifetime of at least 10 refill cycles and more preferably at least 20 refill cycles, at caustic washing temperatures of above 60° C. The container exhibits a reduction in flavor carryover of at least 20% over the previously described refillable CSD prior art container.

The method of forming the container includes a first expansion step in which a substantially amorphous polyester preform is at least partially expanded into an intermediate article, followed by a heat treating step in which the intermediate article is at least partially heated to contract and crystallize the same, and then a second expansion step in which the contracted intermediate article is reexpanded to form the final container.

In a first method embodiment of the invention, a base-forming section of the preform is not expanded during the first expansion step, is not heated and remains substantially unchanged in crystallinity during the heat treating step, and is expanded without significant crystallinity change during the second expansion step. In contrast, a sidewall-forming section of the preform is expanded during the first expansion step to dimensions substantially equal to or greater than the dimensions of the final container sidewall, heated to crystallize and contract the same below the dimensions of the final container during the heat treating step, and reexpanded during the second expansion step to the final dimensions of the container sidewall. The relatively thinner container sidewall thus achieves a substantially higher percent crystallinity than the thicker base, which provides enhanced resistance to caustic stress cracking in both the sidewall and base.

In a second method embodiment, the base-forming section of the preform is expanded during the first expansion step, but is not heated during the heat treating step so that it maintains a low level of crystallinity compared to the container sidewall. Again, the sidewall-forming section of the preform is expanded during the first expansion step to form an intermediate expanded sidewall with dimensions substantially equal to or greater than the dimensions of the final container sidewall, the expanded intermediate sidewall is then heated to crystallize and contract the same below the dimensions of the final container sidewall, and then the contracted intermediate sidewall is expanded during the second expansion step to the final dimensions of the container sidewall. The thinner container sidewall thus achieves a substantially higher percent crystallinity than the thicker base, which provides enhanced resistance to caustic stress cracking in both the sidewall and base.

The base-forming section of the preform is generally substantially thicker than the sidewall-forming section and thus more resistant to heating (and resultant crystallization) during the heat treating step. In addition, it is preferred to localize or confine the heat treatment to the intermediate sidewall, while the base-forming section (or base) is shielded to prevent heating thereof. In one preferred heat treating step, the intermediate container is heated by passing through a row of heating elements and shielding elements move (or increase in size) to protect the base-forming section (or base) as it moves upwardly with the contracting sidewall. In addition, a contracting centering rod is positioned within the contracting intermediate article, and the internal pressure within the intermediate article is controlled, to promote uniform and controlled contraction thereof. In another preferred heat treating step, a cooling mechanism such as a movable water-cooled base cup remains in contact with the base-forming section (or base) to prevent heating thereof. Alternatively, a cooling mechanism directs a cooling fluid (such as cold air) against the base-forming section (or base) of the contracting article to prevent heating of the base. In addition, the relatively thicker neck and shoulder sections may be shielded to prevent heating thereof.

The resulting container has a highly oriented, relatively thin and highly crystalline sidewall panel portion having at leas 25% average crystallinity, and more preferably about 30 to 35% average crystallinity. The container base includes a thickened base portion of low orientation and crystallinity, i.e., no greater than about 10% average crystallinity. The wall thickness of the thickened base portion is generally at least 3×, and more typically about 3 to 4× that of the panel. Higher crystallinity levels in the panel allow higher wash temperatures, e.g., 65° or 70° C., but require longer processing times (to heat and cool the sidewall). A very high crystallinity level of 50% has been achieved. By average crystallinity is meant an average taken over the entire area of the respective container part, i.e., panel or thickened base portion.

In one embodiment, the container is a one-piece refillable pressurized beverage container with a free-standing base. The sidewall (in particular the panel) has a wall thickness of about 0.5 to about 0.8 mm, and during the first expanding step the sidewall-forming section of the preform is stretched at a planar stretch ratio of about 10–16:1 (i.e., the thickness reduction ratio of the expanded intermediate sidewall to the preform sidewall), and during the second expansion step the contracted intermediate sidewall is stretched at a planar stretch ratio of about 7–15:1, and more preferably 9–11:1 (i.e., the thickness reduction ratio of the final sidewall to the preform sidewall). The container has a champagne base with an upwardly radially increasing arcuate outer base wall, a lowermost chime, and a recessed central dome, the chime preferably having an average percent crystallinity of no greater than about 10%, and more preferably about 2–8%, and the central dome preferably having an average crystallinity of no more than about 8%, and more preferably no more than about 2%.

Alternatively, the container may have a substantially thinner "footed" base including a hemispherical bottom wall with downwardly extending legs which terminate in lowermost supporting feet. The hemispherical bottom wall includes radial ribs between the legs. A relatively thin outer portion of the base (including the ribs, legs and feet) preferably has an average crystallinity of at least about 10%, and more preferably about 15–20%, and a substantially thicker central portion of the bottom wall (without legs) has an average crystallinity of no more than about 8%, and preferably no more than about 2%.

In still another embodiment, the improved resistance to stress cracking and dimensional changes at elevated temperatures make the container of this invention particularly suitable as a hot-fill container.

These and other features of the invention will be more particularly described by the following detailed description and drawings of certain specific embodiments.

Figures 14, 15:
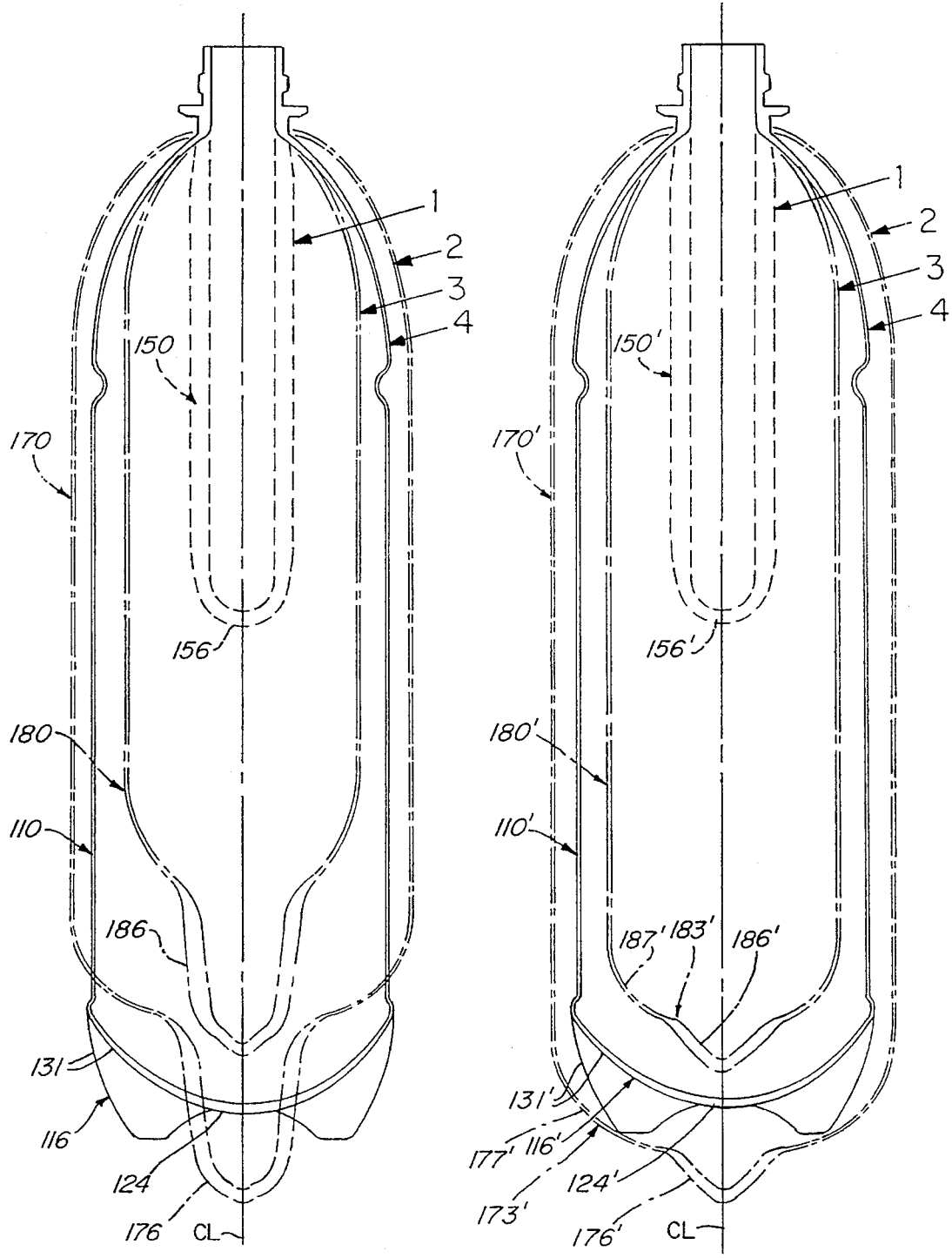
Figure 16:
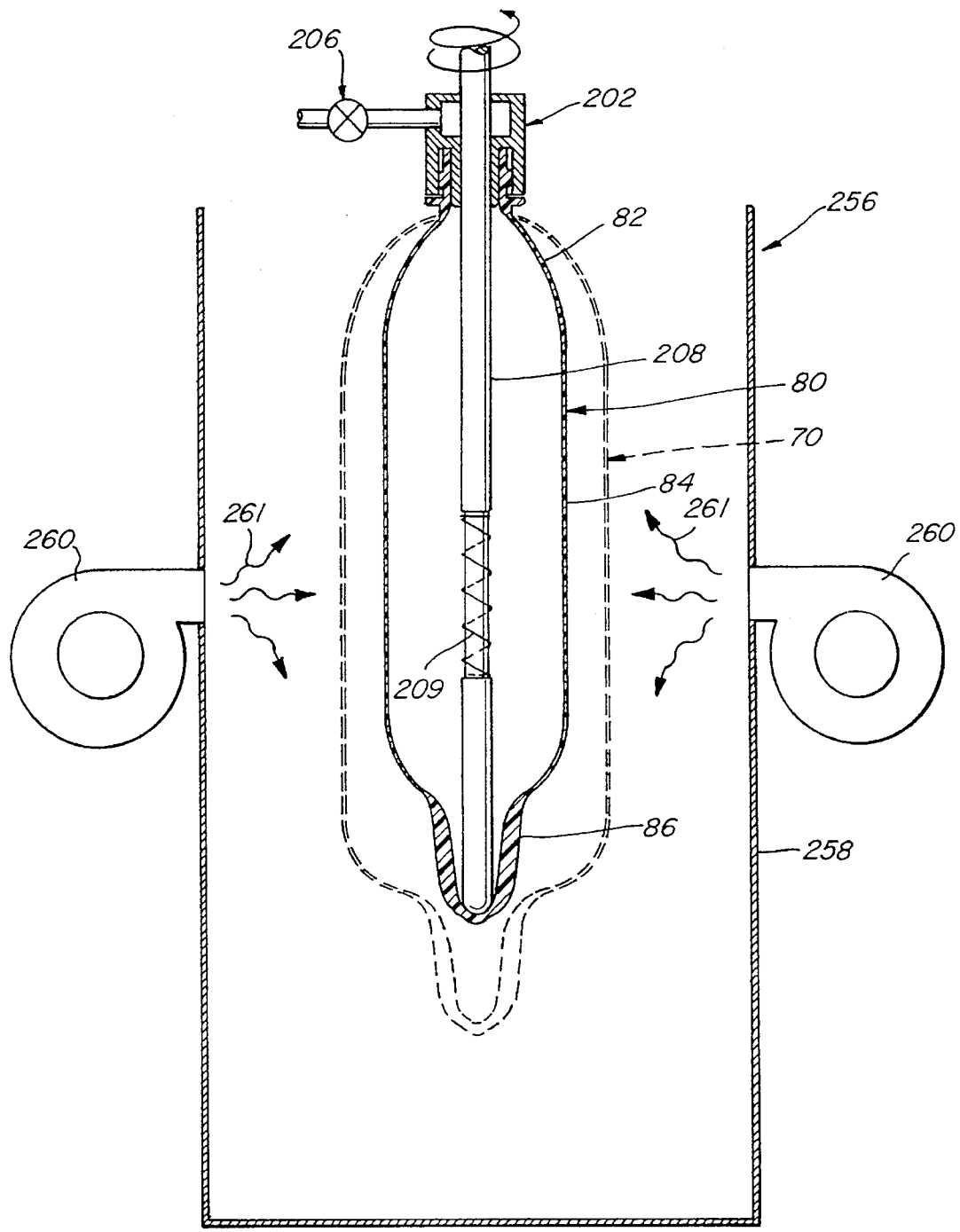
Figure 17:
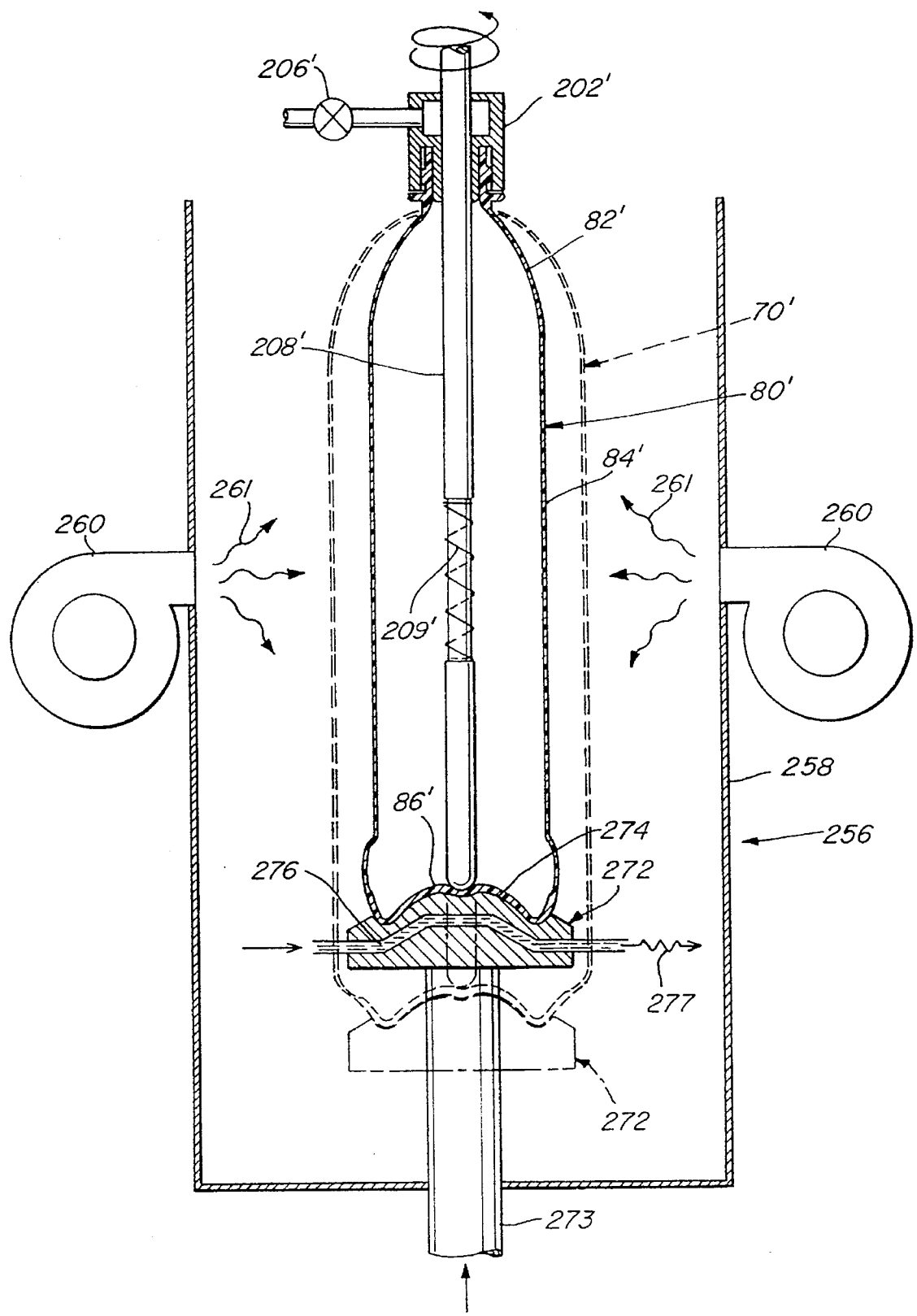
Figure 18:
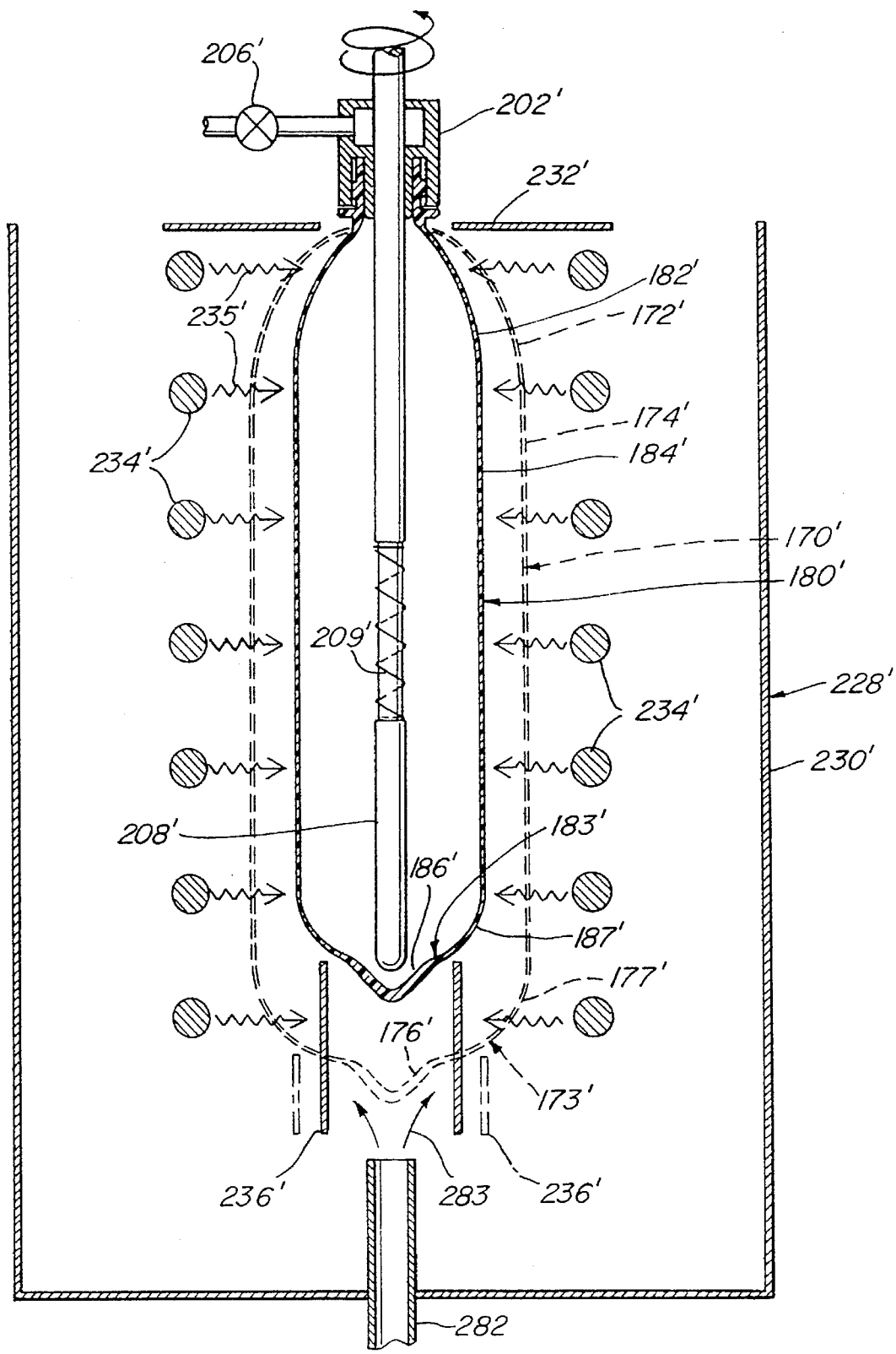
Figure 19:
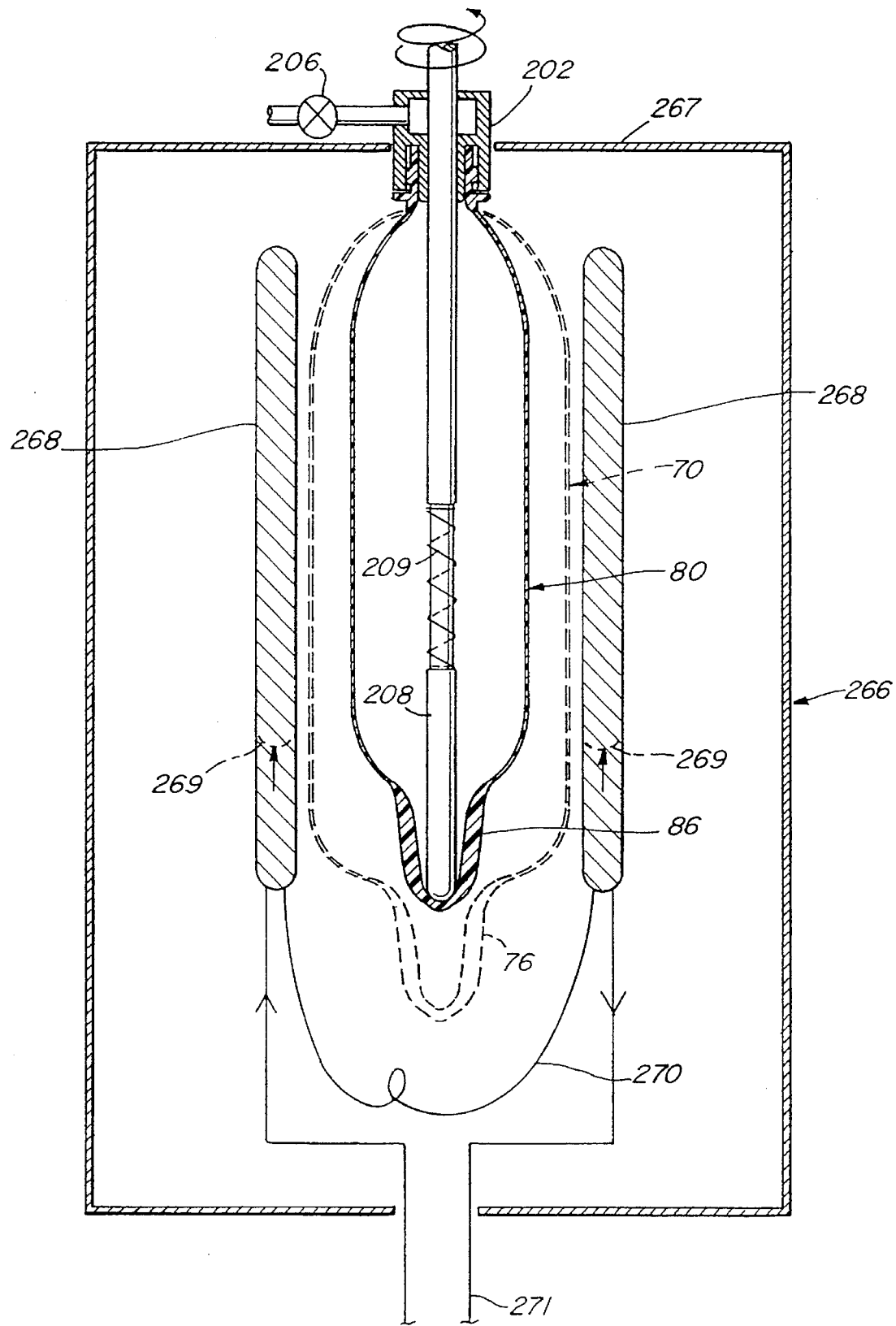

FIGS. 14–15 are schematic profiles of two alternative footed containers, made according to the two previously defined method embodiments, with FIG. 14 showing sequential profiles for the first method embodiment in which the base-forming section is not expanded during the first expansion step, and FIG. 15 showing the sequential profiles for the second method embodiment in which the outer base is partially expanded during the first expansion step;

FIG. 16 is an enlarged schematic of an alternative apparatus for heat treating in which the intermediate article is exposed to hot air from a pair of blowers; the container shown has a champagne base and is made according to the first method embodiment of the invention;

FIG. 17 is an enlarged schematic showing an alternative apparatus for heat treating which includes, in addition to hot air blowers, a water-cooled base cup to prevent heating of the base; the container shown has a champagne base and is made according to the second method embodiment of the invention;

FIG. 18 is an enlarged schematic showing an alternative apparatus for heat treating which includes, in addition to infrared heating elements directed at the sidewall and movable shields for the base, a tube for directing cold air at the base to prevent heating thereof; the container shown has a footed base and is made according to the second method embodiment of the invention; and FIG. 19 is an enlarged schematic showing an alternative apparatus for heat treating, wherein radio frequency (RF) electrodes of variable length are provided to selectively heat the sidewall of a container with a champagne base made according to the first method embodiment of the invention.

DETAILED DESCRIPTION

Figure 1:
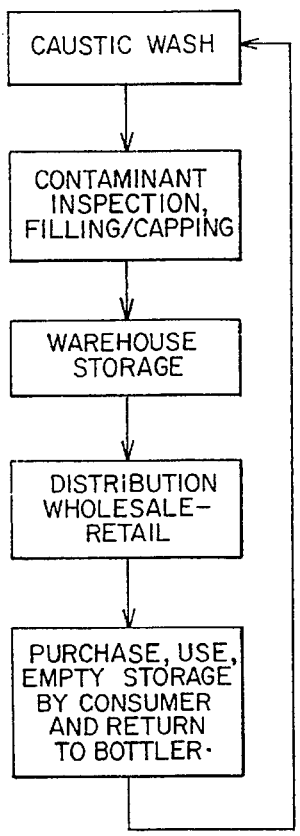
FIG. 1 is a schematic illustration showing a typical cycle or loop through which a refillable container must pass.

Referring now to the drawings, and in particular FIG. 1, a commercial refillable container must withstand numerous refill cycles while maintaining its aesthetic and functional features. A test procedure for simulating such a cycle would be as follows. As used in the specification and claims, the ability to withstand a designated number of refill cycles without crack failure and/or with a maximum volume change is determined according to the following test procedure.

Each container is subjected to a typical commercial caustic wash solution prepared with 3.5% sodium hydroxide by weight and tap water. The wash solution is maintained at the designated wash temperature, i.e., 60° C. or more, in accordance with this invention. The bottles are submerged uncapped in the wash for 15 minutes to simulate the time/temperature conditions of a commercial bottle wash system. After removal from the wash solution, the bottles are rinsed in tap water and then filled with a carbonated water solution at 4.0±0.2 atmospheres (to simulate the pressure in a carbonated soft drink container), capped and placed in a 38° C. convection oven at 50% relative humidity for 24 hours. This elevated oven temperature is selected to simulate longer commercial storage periods at lower ambient temperatures. Upon removal from the oven, the containers are emptied and again subjected to the same refill cycle, until failure.

A failure is defined as any crack propagating through the bottle wall which results in leakage and pressure loss. Volume change is determined by comparing the volume of liquid the container will hold at room temperature, both before and after each refill cycle.

The container of FIG. 2, described below, can withstand at least 20 refills cycles at a wash temperature of greater than 60° C. without failure, and with no more than about 1.5% volume change after 20 cycles. The container also exhibits at least a 20% reduction in product flavor carryover (compared to the prior art CSD bottle) as determined by gas chromatography mass spectrometer measurements.

Figure 2:
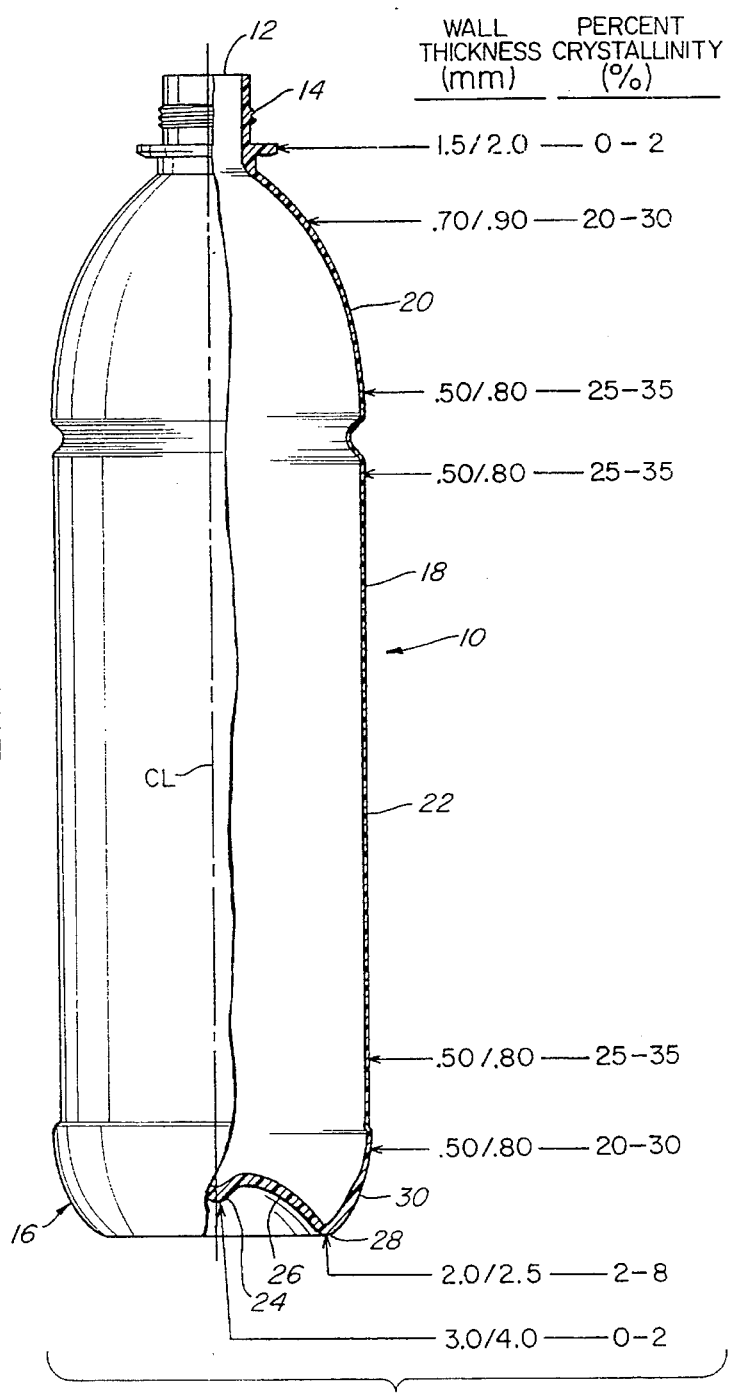
FIG. 2 is a schematic elevational view of a PET refillable 1.5-liter carbonated beverage bottle of this invention with a champagne base, partially broken away, and showing the varying wall thickness and average percent crystallinity at various positions along the bottle.

FIG. 2 shows a PET refillable 1.5 liter carbonated beverage bottle having a relatively thick champagne base, made in accordance with this invention. The bottle 10 is a unitary blow-molded, biaxially-oriented hollow body having an open upper end 12, with external screw threads on neck finish 14 for receiving a screw-on cap (not shown), and a lower closed base 16. Between the neck finish and base is a substantially vertically-disposed sidewall 18 including an upper tapered shoulder portion 20, and a substantially cylindrical panel portion 22 (defined by vertical axis or centerline CL of the bottle). The champagne base 16 has a central outwardly-concave dome with a center gate portion 24, an inwardly concave chime area 28 including a standing ring on which the bottle rests, and a radially increasing and arcuate outer base portion 30 for a smooth transition to the sidewall 18. The chime is a substantially toroidal-shaped area around the standing ring which is thickened to resist stress cracking. The dome and chime form a thickened base portion, which is about 3–4× the thickness of the panel 22, and having an average crystallinity of no greater than about 10%. Preferably, the gate 24 has no more than about 2% average crystallinity and the chime no more than 8% average crystallinity. The thickened base portion resists heating (and thus crystallinization) during the heat treating step, as compared to the thinner sidewall panel 22. Above the chime, there is a thinner outer base portion of about 50–70% of the thickness of the thickened base portion and increasing in crystallinity up to its junction with the sidewall. The thinner outer base wall provides improved impact resistance.

The 1.5 liter container of FIG. 2 is about 13.2 inch (335 mm) in height and about 3.6 inch (92 mm) in (widest) diameter. The varying wall thickness along the bottle from the neck finish to the base is listed (in mm) in FIG. 2, along with the corresponding average percent crystallinity. The varying crystallinity levels correspond to the combined extent to which the bottle wall portion is stretched (strain-induced crystallization) and heated (thermal-induced crystallization). To maintain transparency, any thermal-induced crystallinity should be from low-temperature induced heat setting, e.g., in contact with a mold at mold temperatures of 110°–140° C. for PET. The percent crystallinity is determined according to ASTM 1505 as follows:

$$\% \text{ crystallinity} = [(ds-da)/(dc-da)] \times 100$$

where $ds$=sample density in $g/cm^3$, $da$=density of an amorphous film of zero percent crystallinity (for PET 1.333 $g/cm^3$), and $dc$=density of the crystal calculated from unit cell parameters (for PET 1.455 $g/cm^3$).

A preform for making the container of FIG. 2 has a sidewall thickness of about 0.24 in (6.1 mm) and the sidewall panel 22 is stretched at an average planar stretch ratio of about 10:1. The planar stretch ratio is the ratio of the average thickness of the panel-forming portion of the preform to the average thickness of the panel in the bottle. A preferred planar stretch ratio for polyester refill beverage bottles of about 0.5 to 2.0 liters/volume is about 7–14:1, and more preferably about 8–13:1. The hoop stretch is preferably 3–3.6:1 and the axial stretch 2–3:1. This produces a container sidewall panel with the desired abuse resistance, and a preform sidewall with the desired visual transparency. The sidewall thickness and stretch ratio selected depends on the dimensions of the specific bottle, the internal pressure (e.g., 2 atm for beer, 4 atm for soft drinks), and the processing characteristics of the particular material (as determined for example, by the intrinsic viscosity).

As illustrated in FIG. 2, the panel portion 22 of the container which is blown to the greatest extent has the highest average percent crystallinity of 25–35%. The tapered shoulder 20, which is also expanded substantially more than the base 16, has an average percent crystallinity of 20–30%. In contrast, the substantially thicker and lesser blown base 16 has 0–2% crystallinity in the central gate 24, 2–8% in the chime 28, and ranges therebetween in the dome 26. The outer base 30 crystallinity ranges from that in the chime 28 (2–8%) to about 20–30% where the outer base meets the cylindrical panel 22. The neck finish 14 is not expanded and remains substantially amorphous at 0–2% crystallinity.

Varying levels of crystallinity can be achieved by a combination of expansion (strain-induced) and heat-setting (thermal-induced). Generally, strain-induced crystallinity tends to be substantially uniform across the thickness of the particular layer, while thermal-induced crystallinity may exhibit a gradient across the wall. In this invention, a high level of crystallinity at the inner and outer surfaces of the sidewall alone is sufficient for improved stress crack resistance. However, typically a substantially constant average level of crystallinity is achieved across the sidewall.

The blown container should be substantially transparent based on the percent crystallinity as previously defined. Another measure of transparency is the percent haze for transmitted light through the wall ($H_T$) which is given by the following formula:

$$H_T = [Y_d \div (Y_d + Y_s)] \times 100$$

where $Y_d$ is the diffuse light transmitted by the specimen, and $Y_s$ is the specular light transmitted by the specimen. The diffuse and specular light transmission values are measured in accordance with ASTM Method D 1003, using any standard color difference meter such as model D25D3P manufactured by Hunterlab, Inc. The container of this invention should have a percent haze (through the wall) of less than about 15%, preferably less than about 10%, and more preferably less than about 5%.

The following test was conducted which showed a reduction in flavor carry-over for a 1.5-liter container of FIG. 2 having an average crystallinity level in the panel of 30–35% (container I), and the previously described prior art bottle of the same size and shape having an average crystallinity level in the panel of 15–20% (container II).

A model beverage simulant was prepared comprising the following four materials (common to beverage products) mixed in deionized water at concentrations normal to beverage products:

(a) material A is a cyclohexane;

(b) material B is an aldehyde;

(c) material C is an ethyl compound in the 195–205 molecular weight range; and (d) material D is a simple hydrocarbon chain in the 130–140 molecular weight range.

The model beverage simulant was poured into the sample bottles and held for six weeks at 110° F.

The sample bottles were then emptied out and subjected to a simulated commercial wash at 60° C. and 15 minutes in a 2% sodium hydroxide solution. The bottles were then filled with a weak acetic acid solution and held at 110° F. for another six weeks. Note that this wash procedure is specific to this carryover test and not intended to modify the previously defined refill cycle simulated test procedure.

At the end of the second six-week holding period, the solution was decanted into well sealed glass bottles and refrigerated until tested. Testing was performed using a Hewlett-Packard gas chromatographer 5890A. The sample bottles contained the following average remanents of materials A–D as shown below in micrograms per liter:

|  | Container I (FIG. 2) | Container II (prior art) |
| --- | --- | --- |
| Material A | 92 | 155 |
| Material B | 560 | 962 |
| Material C | 0.13 | 0.25 |
| Material D | 0.57 | 1.2 |

The container of this invention (container I) generally showed about half the flavor carry-over of the known commercial bottle. Containers made according to this invention with even higher levels of crystallinity exhibited still larger reductions in flavor carry-over.

The following test was conducted and showed an improvement in dimensional stability at elevated wash temperatures of the above-described container of this invention (container I), as compared to the previously described prior art container (container II). Again, this specific test is for illustrative purposes and not meant to modify the previously defined refill cycle simulated test procedure.

Generally, a commercially viable refillable PET bottle should have a volume change of no more than 1.5% in 20 loops in up to five years. The shrinkage potential of such a commercial five-year 20-loop cycle in moderate climates was simulated by using a five-hour emersion in a 2% sodium hydroxide solution at the below designated wash temperatures. At each of the three wash temperatures, the container of this invention (container I with 30–35% average crystallizion in the panel) showed significantly less volume change compared to the prior art container (container II). An increase in shrinkage was shown with increasing wash temperature; to accommodate the same, a container with a higher crystallinity may be used, i.e., above 30–35%. Generally, a higher crystallinity level increases the processing cost, including the time of heat treating, so that the bottle is more expensive to produce.

| WASH TEMP (°C.) | CONTAINER I (FIG. 2) | CONTAINER II (Prior Art) |
| --- | --- | --- |
| 60.0 | 0.6% | 1.1% |
| 62.5 | 0.9% | 1.8% |
| 65.0 | 1.7% | 4.2% |

Figure 3:
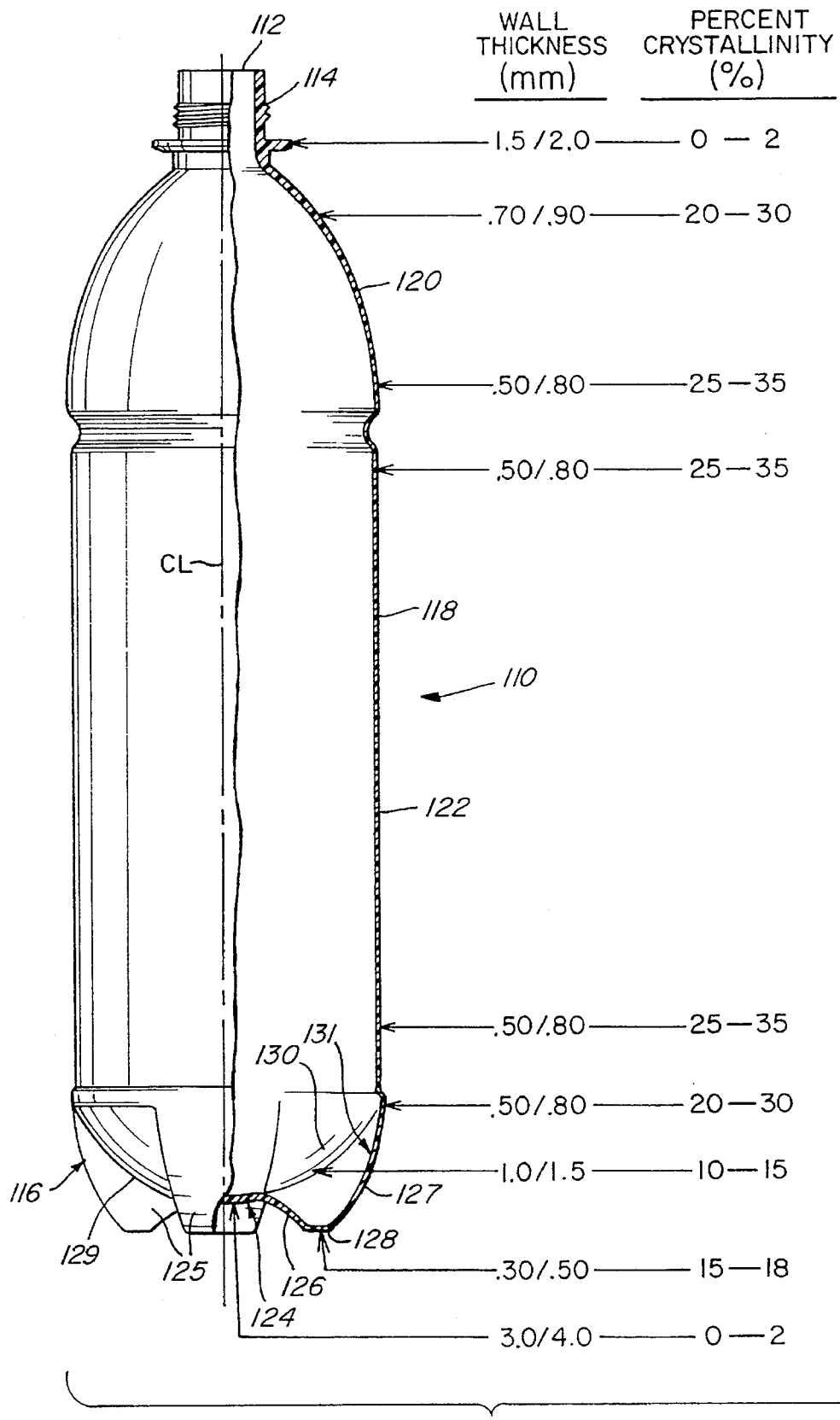
FIG. 3 is a schematic elevational view of a PET refillable 1.5-liter carbonated beverage bottle of this invention with a footed base, partially broken away, and showing the varying wall thickness and percent crystallinity at various positions along the bottle

An alternative PET refillable 1.5 liter carbonated beverage bottle made in accordance with this invention is shown in FIG. 3, but having a substantially thinner footed base. The bottle 110 is a unitary blow-molded, biaxially-oriented hollow body having an open upper end 112, with external screw threads on neck finish 114 for receiving a screw-on cap (not shown), and a closed lower base 116. Between the neck finish and base is a substantially vertically-disposed sidewall 118 including an upper tapered shoulder portion 120, and a substantially cylindrical panel portion 122 (defined by vertical axis or center line CL of the bottle). The integral base 116 is a substantially hemispherical bottom wall 129 with downwardly extending legs 125 each having a lowermost supporting foot 128 on which the container rests. Radiating ribs 130 extend between the legs 125 and form part of the hemispherical bottom wall 129. A central dome portion 124 of the hemispherical bottom wall, which does not include any legs and is relatively thick, forms a thickened central base portion. A thinner outer base portion 131 includes the legs 125, feet 128 and ribs 130. The legs, which are blown further than the hemispherical bottom wall and thus tend to be relatively thinner than the ribs, include an inner leg portion 126 adjacent the dome and an outer leg portion 127 between the foot and sidewall of the container.

As shown in FIG. 3, the average percent crystallinity in the container sidewall varies according to the amount the bottle portion is blown and heated. The panel portion 122 which is blown to the greatest extent, has the highest average crystallinity of 25–35%. The tapered shoulder 120 has the next highest average crystallinity of 20–30%. The unexpanded neck finish 114 is substantially amorphous at 0–2% average crystallinity. The base 116, which is blown substantially less than the sidewall 118, has 0–2% average crystallinity in the central dome 124, 15–8% average crystallinity in the foot 128, 10–15% average crystallinity in the ribs 130 (between the legs), and 20–30% average crystallinity adjacent the junction with the sidewall. The crystallinity of the inner leg portion 126 would vary between that of the dome 124 (0–2%) and the foot 128 (15–18%). The crystallinity of the outer leg portion 127 would likewise vary between that of the foot 128 (15–18%) and the upper base (20–30%).

The substantially higher sidewall panel crystallinity in the containers of FIGS. 2 and 3, along with the substantially lower base crystallinity, provides the enhanced level of resistance to caustic wash induced stress cracking in both the sidewall and base. In addition, it provides a reduction in flavor carryover when the container is filled with different beverages on subsequent refill cycles. The contrasting levels of sidewall and base crystallinity can be achieved by the following two preferred methods of making the container.

A first method embodiment of the invention is shown in FIGS. 4–7. In this first embodiment, the base-forming section of the preform is not expanded during the first expansion step, and the base-forming section remains substantially unchanged in dimensions (and crystallinity) until the second expansion step. While the process is illustrated for making a container with a champagne base, it can similarly be used to make a container with a footed base (see FIG. 14).

Figure 4:
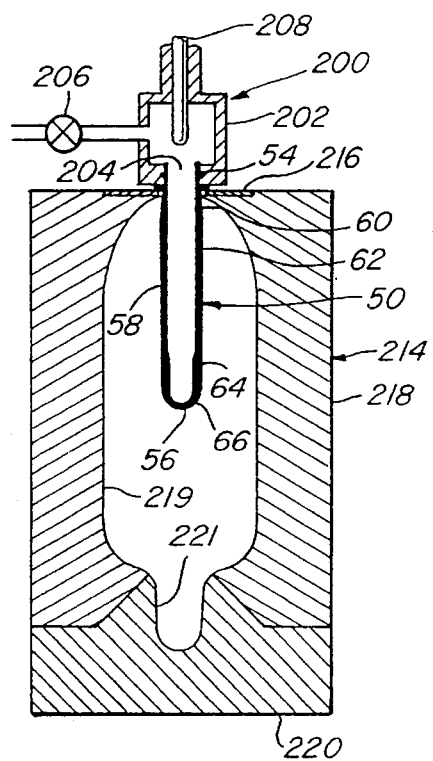
FIGS. 4–7 are schematic illustrations of a first method embodiment of the invention wherein the base-forming section of the preform is not expanded during the first expansion step, with FIG. 4 showing the preform positioned in a blow mold, FIG. 5 showing the first expansion step, FIG. 6 showing the heat treatment by infrared (IR) heating elements and shielding elements around the base-forming section, and FIG. 7 showing the second expansion step to from a final container with a champagne base.

As shown in FIG. 4, a preform 50 is suspended from a rotating collet assembly 200 and positioned in a first mold unit 214. The collet assembly includes a collet 202 which engages a neck finish 54 of the preform and an internal bore 204 for supplying fluid to the interior of the preform. The collet assembly further includes a pressure relief valve 206 for controlling the fluid pressure within the preform during the various expansion and contraction steps, and a movable stretch rod 208 which enhances uniform expansion and contraction of the preform. The mold unit 214 includes a neck plate 216 which engages a flange just below the neck finish 54 on the preform, an upper mold body 218 having an inner surface 219 for forming the sidewall of the intermediate container, and a lower mold body 220 having an inner surface 221 for engaging a base-forming section of the preform (which is not expanded during the first expansion step). The mold portions 216, 218 and 220 are kept at various temperatures for reasons described below. The preform 50, includes a sidewall-forming section 58 and a lower base-forming section 56. The sidewall-forming section 58 includes an upper tapered shoulder-forming section 60 and cylindrical panel-forming section 62. The base-forming portion 56 may include a thickened upper portion 64 and thinner lower portion 66. A preferred preform for making a refill container is described in U.S. Pat. No. 5,066,528 granted Nov. 19, 1991 to Krishnakumar et al., which is hereby incorporated by reference in its entirety.

Figure 5:
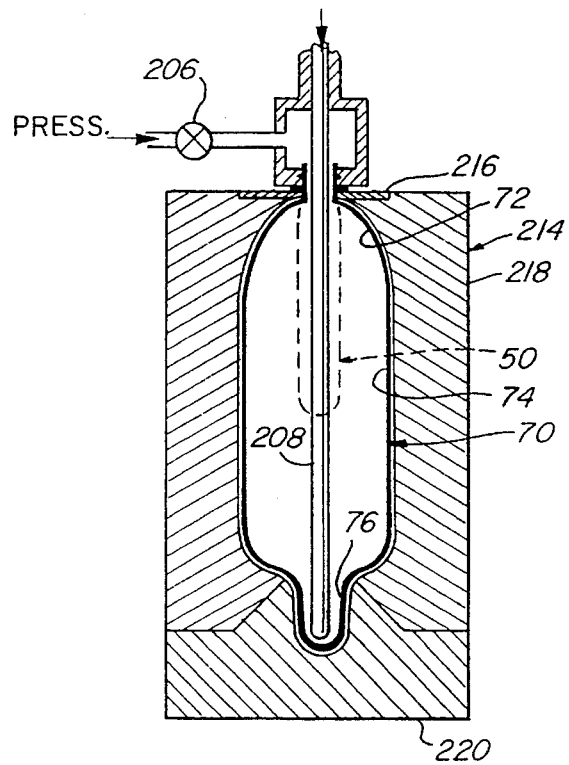

As shown in FIG. 5, during the first expansion step the preform 50 is stretch blown (via rod 208 and a pressurized fluid) to form a first intermediate article 70 having an expanded upper shoulder portion 72, expanded cylindrical panel portion 74, and unexpanded base-forming portion 76. Thus, the unexpanded base-forming portion 76 is substantially identical in dimensions and crystallinity to the preform base-forming section 56 (section 56 may be slightly smaller in diameter to facilitate insertion into the lower mold 220). The preform is hot, e.g., 200° F. (except for the neck finish) when it enters the mold. The preform is cooled as it expands in the mold and the mold sections 216, 218 and 220 are kept at different temperatures to control the crystallinity in different portions of the intermediate article. The neck plate 216 (engaging the neck finish) is kept cold (e.g., 40°–70° F.), the upper mold body 218 (forming the sidewall) is kept the base-forming section) is kept warm (e.g., 150°–180° F.). Thus, the neck finish is kept amorphous, and the base is kept warm (for later expansion) and with very low (if any) crystallinity.

Figure 6:
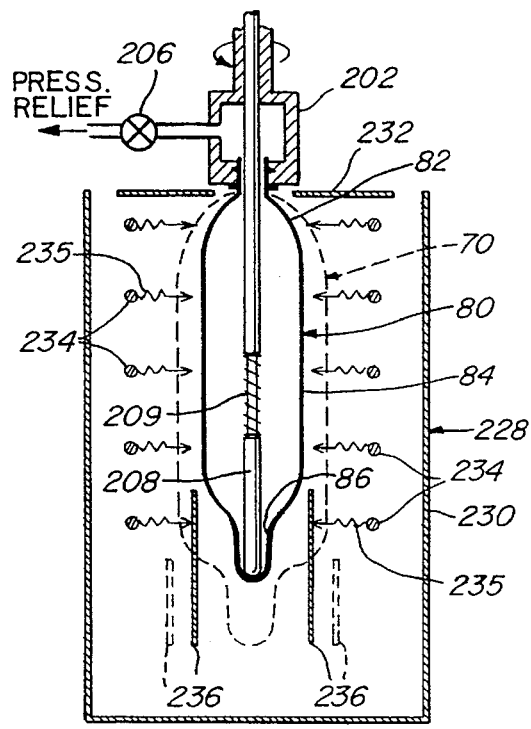

As shown in FIG. 6, the first intermediate article 70 remains on the rotating collet 202 for the heat treating step and the article 70 is inserted into a heat treating unit 228 which includes an outer enclosure 230 with an upper heat shield 232 to protect the amorphous neck finish. The enclosure 230 is an elongated chamber through which the intermediate article 70 passes and the shoulder and panel portions 72, 74 are exposed to heat (arrows 235) from series to infrared (IR) heating elements 234 which cause the sidewall to contract and crystallize as it moves through the chamber to form contracted shoulder portion 82 and contracted panel portion 84 of a second intermediate article 80. The heat treating temperature may be in the range of 400°–500° F. The base portion 76 is shielded from heat 235 by shielding elements 236 which move upwardly with the contracting article as it passes through the chamber. Again the base-forming portion 86 of the second intermediate article remains substantially unchanged in dimensions and crystallinity from the base-forming portion 76 of the first intermediate article. To facilitate uniform contraction of the first intermediate article 70, the centering rod 208 shortens by means of internal spring 209 and the increase in internal pressure within article 70 (due to contraction) is relieved by a pressure relief valve 206 so that the article 70 remains centered and contracts in a controlled and uniform manner.

Figure 7:
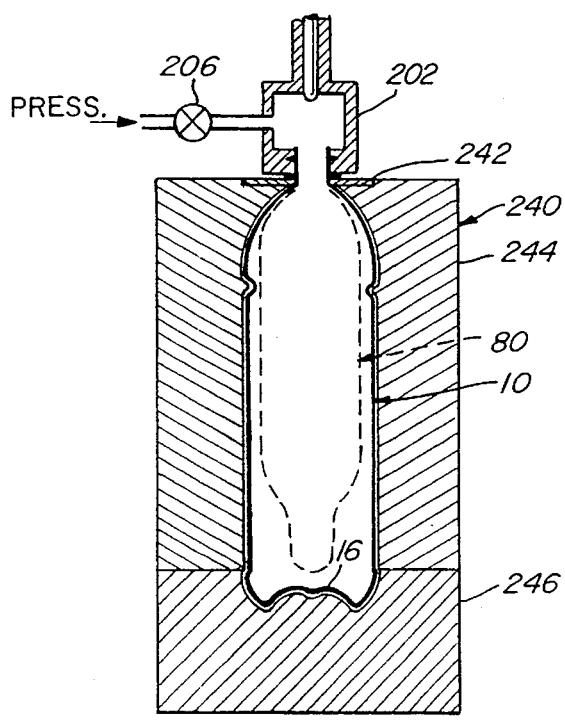

As shown in FIG. 7, during the second expansion step the contracted intermediate article 80 is stretch blown to form the final container 10 (see FIG. 2). The article 80 remains on the rotating collet 202 and is inserted into a second mold unit 240 which includes a neck plate 242, upper mold body 244 and lower mold body 246. Pressurized air is injected through the collet into the article 80 to expand the shoulder, panel and base portions 82, 84 and 86 and form the corresponding portions 20, 22, 16 of the container 10. The intermediate article 80 is cooled as it expands in the mold and the mold sections 242, 244 and 246 are kept at different temperatures to control the crystallinity in different portions of the final container. For example, the neck plate 242 is kept cold (e.g., 40°–70° F.), the upper mold body 244 is kept warm to relieve residual stresses in the sidewall (e.g., 120°–150° F.) and the lower mold body 246 is kept cold to keep the base crystallinity low (e.g., 40°–70° F.). The expanded shoulder and panel sections 20 and 22 thus achieve a substantially higher crystallinity level than the base 16 which optimizes the caustic wash induced stress crack resistance of the container.

Figure 12:
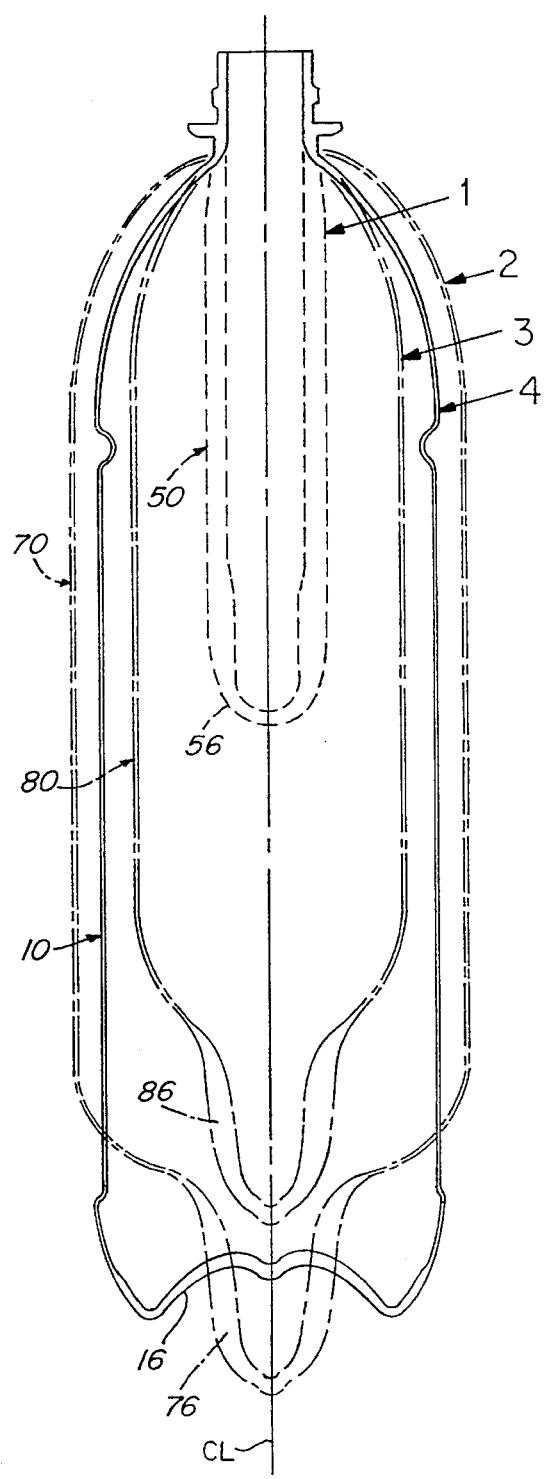
FIGS. 12–13 are schematic profiles of the containers of FIGS. 4–11 during the sequential method steps, with FIG. 12 showing the sequential profiles for the first method embodiment of FIGS. 4–7 (base not blown during first expansion step), and FIG. 13 showing the sequential profiles for the second method embodiment of FIGS. 8–11 (base blown during first expansion step)

FIG. 12 shows a series of container profiles which correspond to the steps shown in FIGS. 4–7. Profile 1 shows the preform 50 of FIG. 4 with the base-forming section 56. Profile 2 shows the first intermediate article 70 after the first expansion step of FIG. 5, with the substantially unexpanded base-forming section 76. Profile 3 shows the second intermediate article 80 after the heat treating step of FIG. 6, with the substantially unchanged base-forming section 86. Profile 4 shows the final container 10 after the second expansion step of FIG. 7, with the expanded but low crystallinity and relatively thick champagne base 16.

The profiles in FIG. 14 correspond substantially to those in FIG. 12 but illustrate the formation of a container 110 having a footed base (see FIG. 3). The reference numbers in FIG. 14 correspond to similar elements in FIG. 12 with the addition of "100". Thus, in FIG. 14, profile 1 shows a preform 150 for a looted container having a base-forming section 156. Profile 2 shows a first intermediate article 170 after the first expansion step with a substantially unchanged base-forming section 176. Profile 3 shows a second intermediate article 180 after the heat treating step again having a substantially unchanged base-forming section 186. Profile 4 shows the final container 110 after the second expansion step having a footed base 116. The footed container 110 can be made in an apparatus similar to that shown in FIGS. 4–7 with corresponding adjustments for the formation of a footed base as opposed to a champagne base.

FIGS. 8–11 are similar to FIGS. 4–7 but illustrate a second method embodiment of this invention wherein the base-forming section of the preform is expanded during the first expansion step. FIGS. 8–11 illustrate the formation of a container having a champagne base, although the process may also be used for the formation of a container having a looted base (see FIG. 15). For similar elements, the reference numbers in FIGS. 8–11 correspond to those in FIGS. 4–7 with the addition of a "prime" notation.

Figure 8:
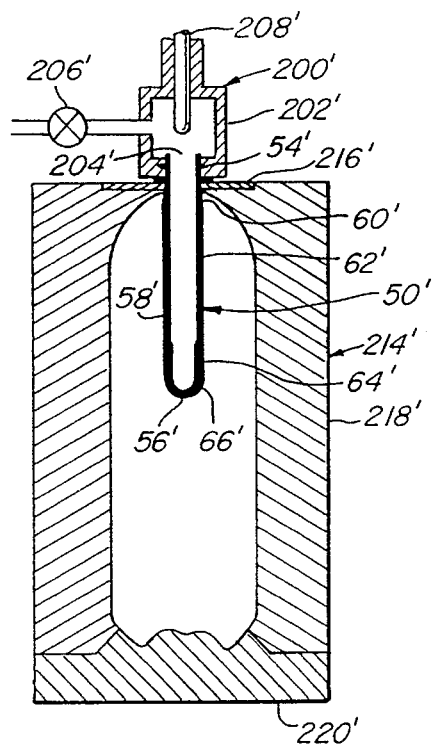
FIGS. 8–11 are schematic illustrations of a second method embodiment of the invention wherein the base-forming section is expanded during the first expansion step, with FIG. 8 showing the preform positioned in a blow mold, FIG. 9 showing the first expansion step which includes expansion of the base, FIG. 10 showing the heat treating step in which the base is shielded, and FIG. 11 showing the second expansion step to form a final container with a champagne base.

Thus, FIG. 8 shows a preform 50' on a rotating collet assembly 200' and positioned within a first mold unit 214'. The elements substantially correspond to those shown in FIG. 4 except for the lower part of the mold unit 214' wherein an expanded champagne base is to be formed by the lower mold unit 220' during the first expansion step.

Figure 9:
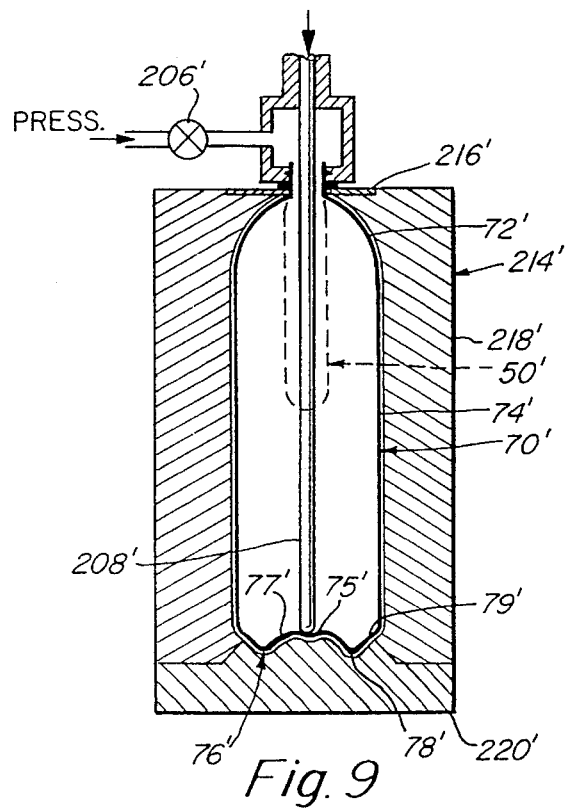

FIG. 9 illustrates the expansion of preform 50' into first intermediate article 70' during the first expansion step. Again, centering rod 208' axially draws the preform 50' and fluid is injected into the center of the drawn preform to radially expand the same against the inner walls of the mold unit 214'. In this second embodiment, the sidewall sections 72' and 74' are again expanded to dimensions equal to or greater than the dimensions of the corresponding final container sidewall sections (20 and 22 in FIG. 2). In addition, the base-forming section 56' is expanded to substantially the same dimensions as the desired dimensions of the final container base (16 in FIG. 2). Thus, following the first expansion step the preform base-forming section 56' has been expanded to form a champagne base 76' with a central gate portion 75', a concave recess 77', a chime 78' and an outer base portion 79'. Similar to the first embodiment, the neck plate 216' is cold (e.g., 40°–70° F.) and the upper mold body is hot (e.g., 180°–210° F.). However, because the base 76' has now been expanded during the first expansion step, the lower mold 220' is cold (e.g., 40°–70° F.) to prevent crystallization of the expanded base.

Figure 10:
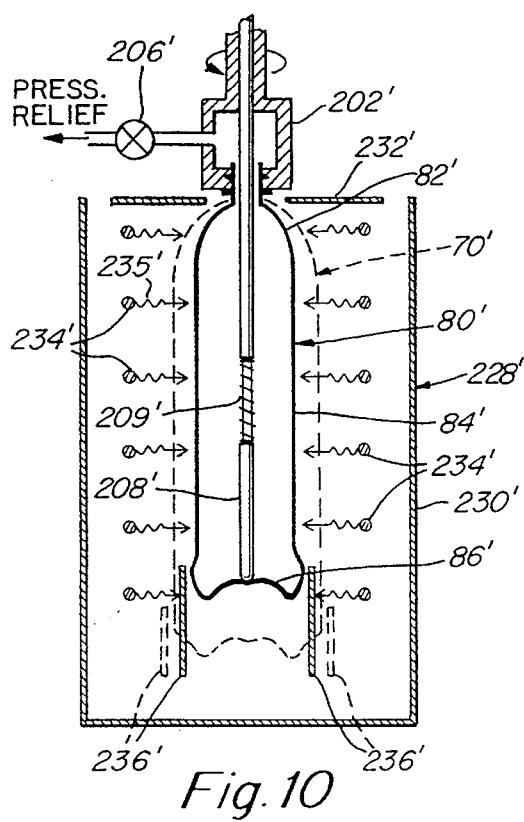

FIG. 10 illustrates the heat treating step in which the first intermediate article 70' is contracted to form the second intermediate article 80'. Again, article 70' is disposed on rotating collet 202' and inserted within a heat treating unit 228' which includes an outer enclosure 230', an upper heat shield 232', and a series of infrared heating elements 234' which apply heat 235' (e.g., 400°–500° F.) to the article 70' as it moves along the elongated heat treating chamber. Again, movable shields 236' protect the base of the article. Following the heat treating step, the shoulder and panel sections 72', 74' have been contracted to form shoulder and panel portions 82', 84' of second intermediate article 80', and the expanded base 76' remains substantially unchanged in dimensions and crystallinity to become base 86'.

Figure 11:
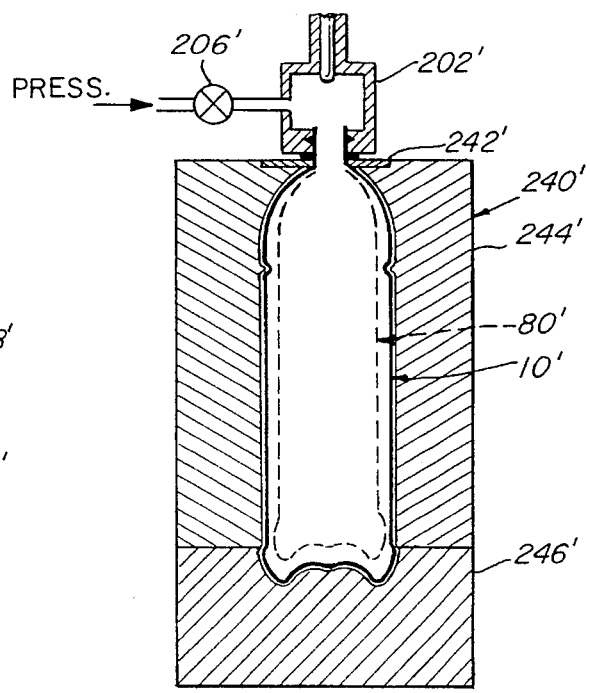

FIG. 11 shows the second expansion step in which contracted intermediate article 80' is expanded to form the final container 10' (same as container 10 in FIG. 2). Again, pressurized air is inserted via collet 202' to expand the contracted shoulder and panel sections 82',84' and form the corresponding shoulder and panel sections 20, 22 of the final container 10'. Again, neck plate 242' is cold (e.g., 40°–70° F.) so the neck finish remains substantially amorphous, upper mold body 244' is warm (e.g., 120°–150° F.) to relieve residual stresses in the shoulder and panel sections of the container, and lower mold body 246' is cold (e.g., 40°–70° F.) so the base 16 remains substantially low in crystallinity. The container base remains substantially unchanged in dimensions and crystallinity during the second expansion step.

Figure 13:
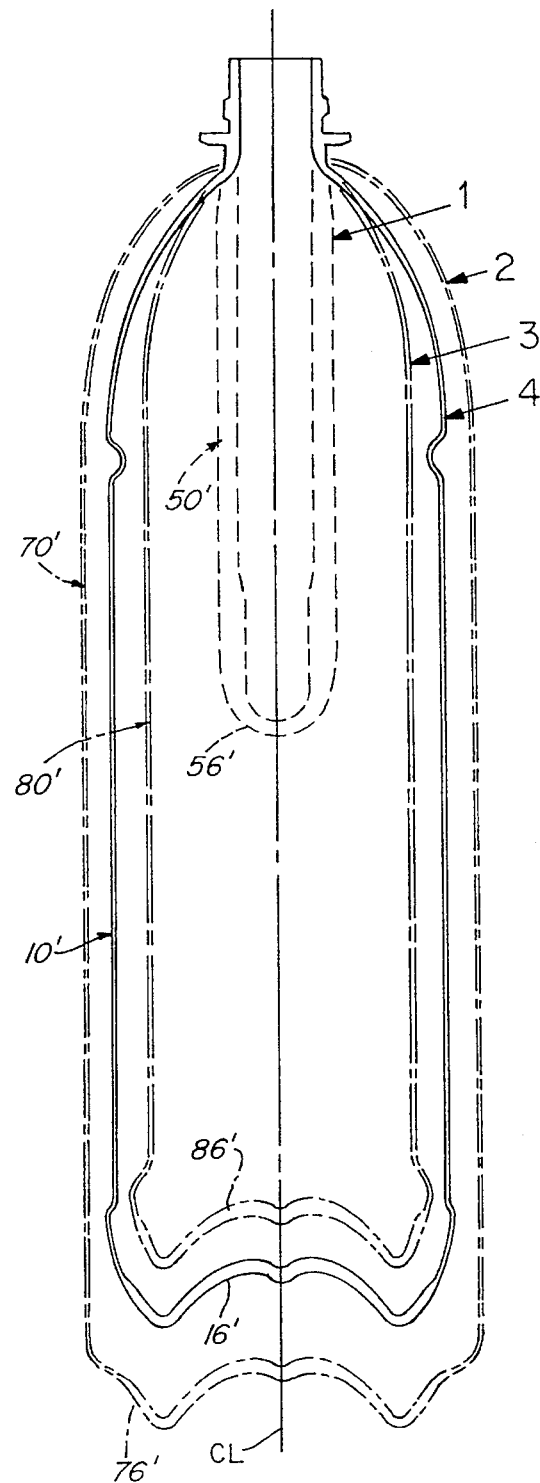

FIG. 13 shows the container profiles corresponding to the second method embodiment (FIGS. 8–11) for a container having a champagne base. Thus, profile 1 shows the preform 50' having base-forming section 56'. Profile 2 shows the first intermediate article 70' after the first expansion step having an expanded base 76' Profile 3 shows the second intermediate article 80' after the heat treating step having a substantially unchanged base 86'. Profile 4 shows the final container 10' having a contracted sidewall but a substantially unchanged base section 16'.

Similarly, a footed base can be formed according to the second method embodiment of FIGS. 8–11, as shown by the container profiles of FIG. 15. However, in this case a central thickened portion 176' of the base remains unchanged during the first expansion step while an upper base portion 177' is expanded to form an upper hemispherical bottom wall during the first expansion step. Profile 1 shows the preform 150' having a base-forming section 156'. Profile 2 shows the first intermediate article 170' with base 173' after the first expansion step, having an expanded outer base portion 177' but maintaining a substantially thicker unexpanded central base-forming section 176'. Profile 3 shows a second intermediate article 180' with base 183' after the heat treating step, wherein the central thickened base-forming section 186' is substantially unchanged (compared to section 176'), but the expanded sidewall and expanded outer base portion 187' have contracted. Profile 4 shows the final container 110' with base 116' having a thick central hemispherical bottom wall portion 124' (same as 124 in FIG. 3) of very low crystallinity (i.e., less than 2%), and a thinner expanded (although less than the sidewall) section 131' (same as 131 in FIG. 3) including legs, feet and ribs having a relatively high crystallinity (i.e., 10 to 20%), although lower than the sidewall panel (i.e., 25% and above).

FIGS. 16–19 show alternative heat treating apparatus. FIGS. 16 shows the same rotating collet 202, centering rod 208 and second intermediate article 80 of FIG. 6, with an alternative heat treating unit 256 including an outer enclosure 258 and blowers 260 which emit hot air 261 for heating the first intermediate article 70 to form the second intermediate article 80. The thickened base section 86 resists thermal-induced crystallization, although shielding elements may also be provided as shown in FIG. 6.

FIG. 17 illustrates the rotating collet 202', centering rod 208', and second intermediate article 80' of FIG. 10. A heat treating unit 256 is provided which includes hot air blowers 260 for heating the sidewall and a water-cooled base cup 272 for engaging the base section 76' as it moves upwardly with the contracting sidewall and becomes base section 86' (of substantially the same dimensions and crystallinity). The water-cooled base cup 272 is mounted on a movable piston 273 so that it remains in continuous contact with the base as the sidewall contracts and the base moves upwardly. The cup includes an upper surface 274 which engages the thickened base portion, and further includes a channel 276 for water to remove heat (arrow 277) from the base cup.

FIG. 18 shows rotating collet 202', centering rod 208' and a heat treating unit 228' including an outer enclosure 230', upper shield 232' and inductance heating rods 234' which apply heat (arrow 235') to the sidewall of intermediate article 170', and moveable shields 236' for protecting the base 176'. The first intermediate article 170' is adapted to form a footed container and after the first expansion step the thickened central portion 176' remains unchanged but the outer base portion 177' has been expanded. First article 170' contracts to form second intermediate article 180', but the central base portion 176' (and adjacent portions of outer base 177') are cooled by a stream of cool air (arrow 283) provided by pipe 282 to prevent crystallization and contraction of the central base. The resultant second article 180' has a base 183' including thickened central portion 186' and thinner upper base portion 187'.

FIG. 19 shows rotating collet 202, centering rod 208, and second intermediate article 80 similar to FIG. 6, but with heat treating unit 266 including an outer enclosure 267 and a series of radio frequency (RF) electrodes 268 which shorten in length, as shown by arrows and phantom lines 269, as the first intermediate article 70 moves along the chamber and contracts to form the second intermediate article 80. The RF electrodes 268 are supplied by RF power input 271 and inductor 270. By supplying localized heating only to the sidewall as the article contracts and moves through the heat treating chamber, heating of the base section 76 (and 86) is eliminated or substantially reduced.

The thermoplastic polyester materials used in this invention are preferably those based on polyalkylene, and in particular, polyethylene terephthalate (PET). PET polymers are prepared by polymerizing terephthalic acid or its ester-forming derivative with ethylene. The polymer comprises repeating units of ethylene terephthalate of the formula:

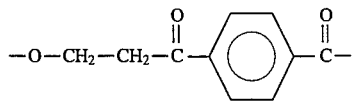

The present invention contemplates the use of copolymers of polyethylene terephthalate in which a minor proportion, for example, up to about 10% by weight, of the ethylene terephthalate units are replaced by compatible monomer units. Thus, as used herein "PET" means PET homopolymer and PET copolymers of the grades suitable for making containers, which are well known in the art. The glycol moiety of the monomer may be replaced by aliphatic or alicyclic glycols such as cyclohexanedimethanol (CHDM), trimethylene glycol, polytetramethylene glycol, hexamethylene glycol, dodecamethylene glycol, diethylene glycol, polyethylene glycol, polypropylene glycol, propane-1,3-diol, butane-1,4-diol, and neopentyl glycol, bisphenols, and other aromatic diols such as hydroquinone and 2,2-bis(4'-B-hydroxethoxyphenyl)propane. Examples of dicarboxylic acid moieties which may be substituted into the monomer unit include aromatic dicarboxylic acids such as isophthalic acid (IPA), phthalic acid, naphthalene-dicarboxylic acid, diphenyldicarboxylic acid, diphenoxyethanedicarboxylic acids, bibenzoic acid, and aliphataic or alicyclic dicarboxylic acids such as adipic acid, sebacic acid, azelaic acid, decanedicarboxylic acid and cyclohexanedicarboxylic acid. In addition, various multifunctional compounds such as trimethylolpropane, pentaerythritol, trimellitic acid and trimesic acid can be copolymerized with the polyethylene terephthalate polymer.

The polyethylene terephthalate polymers may contain other compatible additives and ingredients which do not adversely affect the performance characteristics of the container, such as adversely affecting the taste or other properties of products packaged therein. Examples of such ingredients include thermal stabilizers, light stabilizers, dyes, pigments, plasticizers, fillers, antioxidants, lubricants, extrusion aids, residual monomer scavengers and the like.

The intrinsic viscosity (I.V.) effects the processability of the polyester resins. Polyethylene terephthalate having an intrinsic viscosity of about 0.8 is widely used in the CSD industry. Resins for various applications may range from about 0.55 to about 1.04, and more particularly from about 0.65 to 0.85. Intrinsic viscosity measurements are made according to the procedure of ASTM D-2857, by employing 0.0050±0.0002 g/ml of the polymer in a solvent comprising o-chlorophenol (melting point 0° C.), respectively, at 30° C. Intrinsic viscosity (I.V.) is given by the following formula:

$$I.V. = (\ln(V_{Soln.}/V_{Sol.}))/C$$

where:

$V_{Soln.}$ is the viscosity of the solution in any units;

$V_{Sol.}$ is the viscosity of the solvent in the same units; and

C is the concentration in grams of polymer per 100 mls of solution.

The preform for making the high-transparency refill bottle of this invention should be substantially amorphous, which for PET means up to about 10% crystallinity, preferably no more than about 5% crystallinity, and more preferably no more than about 2% crystallinity. The substantially amorphous or transparent nature of the preform may alternatively be defined by a percent haze ($H_T$) of no more than about 20%, preferably no more than about 10%, and more preferably no more than about 5%. The substantially amorphous preform may be a single layer or multi-layer (e.g., with barrier layers for $O_2$ resistance and/or $CO_2$ retention) preform made according to well-known injection processes, such as those described in U.S. Pat. No. 4,710,118 granted Dec. 1, 1987 to Kirshnakumar et al., which is hereby incorporated by reference in its entirety.

During injection molding of the preform, the hot injected preform may be quenched to room temperature and then reheated to within the orientation temperature range before the distension step, i.e., reheat stretch blow process. Alternatively, the hot injection molded preform may be partially quenched and allowed to equilibrate within the orientation temperature range prior to distending, i.e., integrated process. The substantially amorphous preform is then expanded which produces orientation and crystallization in the sidewall of the container. The extent of stretching can be varied depending on the desired shape and wall thickness of the blown container and is controlled by affixing the relative dimensions of the initial preform and the finished container. The distension step should be carried out in the molecular orientation temperature range for the polyester material being employed. Generally speaking, molecular orientation of an orientable thermoplastic material occurs over a temperature range varying from just above the glass transition temperature (that temperature or narrow temperature range below which the polymer is in a glassy state) up to just below the melt temperature of the polymer. As a practical matter, the formation of oriented containers is carried out in a much narrower temperature range, known as the molecular orientation temperature range. The reason for this is that when the temperature is too close to the glass transition temperature, the material is too stiff to stretch in conventional processing equipment. When the temperature is increased the processibility improves greatly, but a practical upper limit is reached at or near the temperature at which large aggregates of crystallites called spherulites begin to form, because the orientation process is adversely affected by spherulite growth. For substantially amorphous polyester material, the molecular orientation range is typically from about 20° to 65° F. (11° to 36° C.), and more preferably from about 30° to 40° F. (17° to 22° C.), above the glass transition temperature of the polyester material. Typical amorphous PET polymer, which has a glass transition temperature of about 168° F. (76° C.), generally has an orientation temperature range of about 195° F. (91° C.) to about 205° F. (96° C.).

Other factors important in the manufacture of refillable polyester beverage bottles are described in U.S. Pat. No. 4,334,627 to Kirshnakumar et al. granted Jun. 15, 1982, U.S. Pat. No. 4,725,464 to Collette granted Feb. 16, 1988, and U.S. Pat. No. 5,066,528 to Krishnakumar et al. granted Nov. 19, 1991, which are hereby incorporated by reference in their entirety.

As a further alternative, a multilayer preform described in a commonly assigned and copending Ser. No. 07/909,961, entitled "Multi-Layer Refillable Container, Preform And Method Of Forming Same," filed by inventors Collette et al, on Jul. 7, 1992, and a continuation-in-part application thereof filed on the same date as this application can be used in combination with the process of this invention. In addition to use of a high-copolymer (4–6%) core layer between low-copolymer (0–2%) inner and outer layers, other multi-layer containers may include barrier, high thermal stability, recycle or post-consumer PET, or other layers.

As previously described, the plastic container of this invention is preferably made of polyethelene terephthalate (PET). However, other thermoplastic polyester resins may be used. The materials, wall thicknesses, preform and bottle contours, and processing techniques may all be varied for a specific end product, while still incorporating the substance of this invention. The container may be for other pressurized or unpressurized beverages (such as beer, juice or milk), or for non-beverage products. The benefits of the invention, for example the improved stress crack resistance at elevated temperatures, may be particularly suitable for use as a hot-fill container, such as described in U.S. Pat. No. 4,863,046 to Collette et al. granted Sep. 5, 1989, which is hereby incorporated by reference in its entirety. Hot-fill containers typically must withstand elevated temperatures on the order of 180°–185° F. (the product filling temperature) and positive internal pressures on the order of 2–5 psi (the filling line pressure) without substantial deformation (i.e., volume charge of no greater than about 1%).

Thus, although several preferred embodiments of this invention have been specifically illustrated and described herein, it is to be understood that variations may be made in the preform construction, materials, the container construction and methods of forming the container without departing from the spirit and scope of the invention as defined by the appended claims,

What is claimed is:

1. A method of making a container having a sidewall and base comprising the steps of:

providing a substantially amorphous polyester preform body having a sidewall-forming section and a base-forming section, wherein the sidewall- and base-forming sections are within the orientation temperature range of the polyester;

expanding the sidewall-forming section at least radially to form an intermediate article having an intermediate expanded sidewall with dimensions substantially equal to or greater than the dimensions of the final container sidewall, and expanding the base-forming section at least radially up to substantially the same dimensions as the final container base;

heating the expanded intermediate sidewall to crystallize and contract the same below the dimensions of the final container sidewall, while the base substantially maintains its dimensions and percent crystallinity; and expanding the contracted intermediate sidewall while in the orientation temperature range to the final dimensions of the container sidewall, while the base substantially maintains its dimensions and percent crystallinity.

2. The method of claim 1, wherein during the heating step the base is shielded in order to substantially maintain its dimensions and percent crystallinity.

3. The method of any one of claims 1 and 2, wherein during the heating step the base is cooled in order to substantially maintain its dimensions and percent crystallinity.

4. The method of claim 3, wherein the heating step includes heating the base to at least partially relieve any strain generated in the base during the first expanding step.

5. The method of claim 1, wherein during the heating step a centering rod is provided within the preform which contracts along with the contracting intermediate container.

6. The method of claim 1, wherein during the heating step the internal pressure in the intermediate article is controlled to promote uniform contraction.

7. The method of claim 1, wherein the first expanding step is a blow molding into a first outer mold having an upper portion at a first temperature for engaging the expanded intermediate sidewall, and a lower portion for engaging the base at a second temperature lower than the first temperature.

8. The method of any one of claims 1 or 7, wherein the second expanding step is a blow molding into a second outer mold having an upper portion at a third temperature for engaging the sidewall of the container and a lower portion for engaging the base at a fourth temperature equal to or lower than the third temperature to deter crystallization of the base.

9. The method of claim 1, wherein during the first expanding step the expanded intermediate sidewall is formed with an upper shoulder which has been expanded more radially than in the final container.

10. The method of claim 1, wherein during the second expanding step at least a portion of the container base is formed having a wall thickness substantially greater than that of the sidewall.

11. The method of claim 1, wherein the base portion formed has a percent crystallinity of no greater than about 10%.

12. The method of claim 1, wherein the preform is substantially polyethylene terephthalate.

13. The method of any one of claims 1 or 10, wherein during the second expanding step the container sidewall formed has a percent crystallinity of at least about 20%.

14. The method of claim 13, wherein during the second expanding step at least a portion of the container sidewall is formed having a percent crystallinity of at least about 25%.

15. The method of claim 14, wherein the sidewall portion formed has a percent crystallinity of about 25% to about 45%.

16. The method of claim 15, wherein during the second expanding step the container sidewall formed has a wall thickness of about 0.5 to about 0.7 mm.

17. The method of claim 16, wherein during the first expanding step the sidewall-forming section is stretched at a planar stretch ratio of about 10–16:1.

18. The method of claim 17, wherein during the second expanding step the contracted intermediate sidewall is stretched at a planar stretch ratio of about 7–15:1.

19. The method of claim 18, wherein during the second expanding step the contracted intermediate sidewall is stretched at a planar stretch ratio of about 8–13:1.

20. The method of claim 1, wherein during the second expanding step the container formed can withstand at least 5 refill cycles in a caustic wash at a temperature of at least about 65° C. without crack failure.

21. The method of claim 1, wherein during the second expanding step the container formed can withstand at least 10 refill cycles in a caustic wash at a temperature of at least about 65° C. without crack failure.

22. The method of claim 1, wherein during the second expanding step the container formed can withstand at least 5 refill cycles in a caustic wash at a temperature of at least about 70° C. without crack failure.

23. The method of claim 1, wherein during the second expanding step the container formed can withstand at least 10 refill cycles in a caustic wash at a temperature of at least about 70° C. without crack failure.

24. The method of any one of claims 20–23, wherein the container formed can withstand the designated refill cycles with a maximum volume deviation of about ±1.5%.

25. The method of claim 1, wherein the formed container is adapted to hold a pressurized product.

26. The method of claim 1, wherein the formed container is a one-piece container with a free-standing base.

27. The method of claim 26, wherein the formed container has a champagne-type base with a central recess and a lowermost chime.

28. The method of claim 27, wherein the chime and recess formed have a percent crystallinity of no more than about 8%.

29. The method of claim 1, wherein during the heating step the heat treating temperature is substantially above the orientation temperature range of the polyester.

30. The method of claim 29, wherein the heat treating temperature is on the order of 400°–500° F.

31. The method of claim 1, wherein during the expanding step the sidewall-forming section is radially expanded to dimensions greater the dimensions of the final container sidewall.

32. A method of making a container having a sidewall and base comprising the steps of:

providing a substantially amorphous polyethylene terephthalate preform having a sidewall-forming section and a base-forming section, wherein the sidewall-forming section is within the orientation temperature range of polyethylene terephthalate;

expanding the sidewall-forming section axially and radially at a planar stretch ratio of about 10–16:1 to form an intermediate article having an expanded intermediate sidewall with dimensions substantially equal to or greater than the dimensions of the final container sidewall, expanding the base-forming section at least radially up to substantially the same dimensions as the final container base;

heating the expanded intermediate sidewall to crystallize and contract the same below the dimensions of the final container sidewall, while the base substantially maintains its dimensions and percent crystallinity; and expanding the contracted intermediate sidewall while in the orientation temperature range to the final dimensions of the container sidewall, the contracted intermediate sidewall being stretched at a planar stretch ratio of about 7–15:1 (sidewall:sidewall-forming section) to form the sidewall having a wall thickness of about 0.5 to about 0.7 mm and a percent crystallinity of at least about 20%, and the base having a percent crystallinity of no greater than about 10%.

33. A method of making a container having a sidewall and base comprising the steps of:

providing a substantially amorphous polyester preform body having a sidewall-forming section, an outer base-forming section, and a central base-forming section, and wherein the sidewall- and outer base-forming sections are within the orientation temperature range of the polyester;

expanding the sidewall- and outer base-forming sections at least radially to form an intermediate article having an expanded intermediate sidewall and outer base with dimensions substantially equal to or greater than the dimensions of the final container sidewall and outer base, while the central base-forming section remains substantially unchanged in dimensions;

heating the expanded intermediate sidewall and outer base to crystalize and contract the same below the dimensions of the final container sidewall and outer base, while the central base-forming section remains substantially amorphous and substantially unchanged in dimensions; and expanding the contracted intermediate sidewall and outer base while in the orientation temperature range to the final dimensions of the container sidewall and outer base, and expanding the central base-forming portion to the final dimensions of the central base.

34. The method of claim 33, wherein the container formed has a footed base with a substantially hemispherical bottom wall having downwardly-extending legs which terminate in lowermost supporting feet.

35. The method of claim 34, wherein the outer base comprises an upper base portion (with legs) having a percent crystallinity of at least about 10%, and the central base comprises a central portion of the hemispherical bottom wall (without legs) having a percent crystallinity of no more than about 2%.

36. The method of claim 33, wherein the sidewall formed includes an upper tapered shoulder and a substantially cylindrical panel, and wherein the heating and expanding produce an average crystallinity in the panel of at least about 25%.

37. The method of claim 33, wherein the polyester is substantially polyethylene terephthalate (PET).

38. The method of claim 33, wherein the polyester is a homopolymer or copolymer of PET.

39. The method of claim 33, wherein the heating and expanding provide sufficient wall thickness, biaxial orientation and crystallinity to form a free-standing pressurizable container.

40. The method of claim 33, herein during the first expanding step the sidewall-forming section is expanded both axially and radially.

41. The method of claim 33, wherein during the second expanding step the contracted intermediate sidewall and outer base are expanded radially.

42. The method of claim 33, wherein the preform is provided with a base-forming section which is substantially thicker than the sidewall-forming section so that the base-forming section resists expansion.

43. The method of claim 33, wherein the container is formed with a footed base having a substantially hemispherical bottom wall, the bottom wall including a central thickened base portion which is at least about 3× the panel thickness and having an average crystallinity of no greater than about 10%, and a thinner outer base portion with radial ribs and downwardly-extending legs which terminate in lowermost supporting feet.

44. The method of claim 43, wherein the container formed has a thinner outer base portion with an average crystallinity of from about 10–20%.

45. The method of claim 33, wherein the container formed comprises a substantially transparent, biaxially-oriented, free-standing, blow-molded polyester body, the body having a sidewall with an upper tapered shoulder and a substantially cylindrical panel, and the base having a thickened base portion with a wall thickness at least about 3× greater than the thickness of the panel, the panel having an average crystallinity of at least about 25% and the thickened base portion having an average crystallinity of no greater than about 10%.

* * * * *

UNITED STATES PATENT AND TRADEMARK OFFICE
CERTIFICATE OF CORRECTION

PATENT NO. : 5,520,877
DATED : May 28, 1996
INVENTOR(S) : Collette et al.

It is certified that error appears in the above-indentified patent and that said Letters Patent is hereby corrected as shown below:

Col. 10, line 24 . -- after "kept" insert -- hot (180-210° F.), and the lower mold body (engaging --

Col. 11, line 24 -- delete "looted" and substitute -- footed --

Col. 11, line 41 -- delete "looted" and substitute -- footed --

Signed and Sealed this

Seventh Day of January, 1997

Attest:

BRUCE LEHMAN

Attesting Officer

Commissioner of Patents and Trademarks